United States Patent
Bothe et al.

(10) Patent No.: US 7,510,502 B2
(45) Date of Patent: Mar. 31, 2009

(54) METHOD FOR PREVENTING LOAD CHANGE IMPACTS IN A MOTOR VEHICLE

(75) Inventors: Edgar Bothe, Peine (DE); Wolfgang Schreiber, Isenbüttel (DE)

(73) Assignee: Volkswagen AG, Wolfsburg (DE)

( * ) Notice: Subject to any disclaimer, the term of this patent is extended or adjusted under 35 U.S.C. 154(b) by 390 days.

(21) Appl. No.: 11/503,677

(22) Filed: Aug. 14, 2006

(65) Prior Publication Data

US 2007/0191185 A1    Aug. 16, 2007

Related U.S. Application Data

(63) Continuation of application No. PCT/EP2005/001269, filed on Feb. 8, 2005.

(30) Foreign Application Priority Data

Feb. 12, 2004    (DE) .................. 10 2004 007 160

(51) Int. Cl.
  *F16D 48/06*    (2006.01)
(52) U.S. Cl. .......................................... 477/73
(58) Field of Classification Search ............ 477/73, 477/74, 75, 78
  See application file for complete search history.

(56) References Cited

U.S. PATENT DOCUMENTS

| | | | |
|---|---|---|---|
| 4,930,374 A | | 6/1990 | Simonyi et al. |
| 5,082,096 A | * | 1/1992 | Yamashita et al. ........... 477/175 |
| 5,314,050 A | * | 5/1994 | Slicker et al. ................ 477/171 |
| 5,322,150 A | * | 6/1994 | Schmidt-Brucken et al. ..... 477/176 |
| 6,086,514 A | * | 7/2000 | Jones et al. .................. 477/180 |
| 6,656,090 B2 | * | 12/2003 | Matsumura et al. .......... 477/171 |
| 6,729,999 B2 | | 5/2004 | Döbele |
| 6,761,659 B2 | * | 7/2004 | Eguchi et al. ................ 475/174 |
| 2004/0029680 A1 | | 2/2004 | Dobele |

FOREIGN PATENT DOCUMENTS

| | | |
|---|---|---|
| DE | 39 18 254 A1 | 12/1989 |
| DE | 38 23 387 A1 | 1/1990 |
| DE | 44 42 025 A1 | 6/1995 |
| DE | 100 32 951 A1 | 1/2002 |
| DE | 102 32 229 A1 | 2/2003 |
| DE | 10139558 A1 | 2/2003 |
| DE | 101 38 998 A1 | 3/2003 |
| DE | 102 32 229 A1 | 2/2004 |
| EP | 0 323 070 A2 | 7/1989 |
| GB | 2 221 969 A1 | 2/1990 |
| SU | 1752182 A3 | 7/1992 |

OTHER PUBLICATIONS

German Search Report, dated Oct. 21, 2004.
International Search Report, dated May 18, 2005.
Russian Search Report dated Apr. 11, 2008.

* cited by examiner

*Primary Examiner*—Dirk Wright

(57) ABSTRACT

Load change impacts in a motor vehicle, especially as a result of abrupt changes in the position of the accelerator pedal, are prevented with the novel method. At least one dual clutch mechanism is provided between the drive engine and the gearbox. The gearbox has several selectable gear steps and the clutch is controlled in relation to the torque that is to be transmitted. The driving comfort is improved by controlling the clutch during the starting process of the motor vehicle and/or the gear steps are engaged during the starting process of the vehicle in such a way that the speed of rotation of the gear input shaft is lower than the idling speed of rotation of the engine.

15 Claims, 2 Drawing Sheets

METHOD FOR PREVENTING LOAD CHANGE IMPACTS IN A MOTOR VEHICLE

CROSS-REFERENCE TO RELATED APPLICATIONS

This is a continuing application, under 35 U.S.C. § 120, of copending international application PCT/EP2005/001269, filed Feb. 8, 2005, which designated the United States; this application also claims the priority, under 35 U.S.C. § 119, of German patent application No. 10 2004 007 160.8, filed Jan. 7, 2004; the prior applications are herewith incorporated by reference in their entirety.

BACKGROUND OF THE INVENTION

Field of the Invention

The invention lies in the automotive technology field. More specifically, the invention relates to a method for preventing load change impacts in a motor vehicle, in particular owing to abrupt changes in the position of the accelerator pedal. At least one clutch is provided between a drive engine and a transmission, in particular a double clutch transmission of the motor vehicle. The transmission has a plurality of gear speeds which can be engaged, and the clutch is actuated with respect to the torque to be transmitted.

Motor vehicles with transmissions with clutches, in particular friction clutches as a starting element, generally behave more uncomfortably when load changes occur in low gear speeds than motor vehicles with automatic transmissions or with torque converters which are connected intermediately. Load changes or load change impacts are transitions between the traction mode and over-run mode of the drive engine.

In motor vehicles with manual shift gearboxes, load changes generally take place when the clutch is closed. In this case, the load change behavior is determined by the engine controller (load impact damping, anti-judder function). Load changes in a slipping clutch are rather rare. A jolt in such a situation is generally interpreted and accepted as being an incorrect operating procedure by the driver.

In motor vehicles with automatic transmissions which have a hydraulic torque converter as the starting element behave more favorably. Positive load changes (from the over-run mode into the traction mode) are damped by the coupling of the drive engine by means of the torque converter. Negative load changes (from the traction mode into the over-run mode) are uncritical since no appreciable over-run torque is built up by means of the torque converter. Motor vehicles with a transmission and with an actuable clutch, in particular an automated starting clutch, behave like motor vehicles with manual shift transmissions in the range of low driving speeds. However, in these vehicles a jolt is not accepted in any driving situation and therefore has an uncomfortable effect. Thus, in certain transmissions with an automatic starting clutch, in particular in a double clutch transmission, a level of driving comfort is expected which corresponds more to the driving comfort of a conventional automatic transmission than to the comfort of a manual shift transmission.

A method for preventing load change impacts in a motor vehicle is known (see, commonly assigned German patent application DE 39 18 254 A1) in which, owing to abrupt changes in the position of the accelerator pedal, for example from an over-run position into a load position, the clutch is actuated in such a way that it is moved with a predefinable slip into an engagement position which is assigned to the position of the accelerator pedal. The rise in the torque which can be transmitted by the clutch is controlled as a function of the rotational speed and/or the acceleration of the drive engine. However, the expenditure on control here is very large while the driving comfort is still not optimum.

Consequently, the methods which have been known hitherto in the prior art for preventing load change impacts in a motor vehicle have not yet been configured in an optimum way. On the one hand, the previously known expenditure on control is very large, while on the other hand the driving comfort is still capable of improvement.

SUMMARY OF THE INVENTION

It is accordingly an object of the invention to provide a method for preventing load change impacts in a motor vehicle which overcomes the above-mentioned disadvantages of the heretofore-known devices and methods of this general type and which provides for corresponding load change impacts in a motor vehicle to be avoided, in particular the expenditure on control to be considerably simplified or minimized, that is to say in particular the travel comfort is improved.

With the foregoing and other objects in view there is provided, in accordance with the invention, a method for preventing load change impacts in a motor vehicle, the motor vehicle having at least one clutch between a drive engine and a transmission, and the transmission having a plurality of selectively engageable gear speeds, and the clutch being actuated with respect to a torque to be transmitted. The method comprises the following steps:

during a starting process of the motor vehicle, actuating the clutch and/or engaging the gear speeds in the transmission, such that a transmission input shaft speed lies below an engine idling speed; and when a predetermined difference in rotational speed is reached, where a specific transmission input shaft speed is reached, switching the transmission to a next higher gear speed.

In other words, the objects of the invention are achieved in that during the starting process of the motor vehicle the clutch is actuated, and/or during the starting process of the motor vehicle the gear speeds in the transmission are engaged, in such a way that the transmission input shaft speed is below the engine idling speed.

There are a multiplicity of possible ways of advantageously configuring and developing the method according to the invention. By way of example:

In accordance with an added feature of the invention, the clutch is actuated in such a way that when the first gear speed is engaged the transmission input shaft speed is made to approach the engine idling speed until the predetermined difference in rotational speed is present.

In accordance with another feature of the invention, in the next highest gear speed the transmission input shaft speed is then in turn made to approach the specific transmission input shaft speed.

Preferably, the foregoing method steps are carried out until the transmission shifts into its third gear speed or its highest gear speed.

In accordance with a further feature of the invention, the clutch is slip-controlled.

With the above and other objects in view there is also provided, in accordance with the invention, a method that comprises the following steps:

during a braking or coasting process of the motor vehicle, actuating the clutch and/or engaging the gear speeds in the transmission, such that a transmission input shaft speed lies below an engine idling speed; and shifting the transmission from a currently engaged, old gear speed into a new, next-lower gear speed if, after a corresponding synchronization, a specific transmission input shaft speed is reached with a correspondingly engaged new gear speed, so that a predetermined difference in rotational speed with respect to the engine idling speed is present.

In other words, the objects of the invention are achieved in that during the braking or coasting (over-running) process of the motor vehicle the clutch is actuated, and/or the gear speeds in the transmission are engaged, in such a way that the transmission input shaft speed is below the engine idling speed.

In principle, the method according to the invention is therefore applied in particular in a starting process of the motor vehicle, in particular specifically in the state of starting at a crawl, without activating the accelerator pedal and in particular for the starting process of "starting at a crawl with minimal opening of the throttle", that is to say with slight activation of the accelerator pedal, which is also explained in detail below. Furthermore, the method according to the invention is well suited for the "opposite" driving state of a motor vehicle, that is to say for the braking process or for the coasting process of the motor vehicle. The method is based on the basic idea that the clutch is actuated or activated, and/or the gear speeds in the transmission are engaged, in such a way that the transmission input shaft speed is always just below the engine idling speed. On this condition in fact no over-run torque is built up when the driver's foot is taken off the accelerator pedal. The output torque of the transmission train, that is to say the output torque at the driven wheels of the motor vehicle, is always positive. A jolt in the motor vehicle is therefore avoided when the driver takes his foot off the accelerator pedal, that is to say when the position of the accelerator pedal changes. According to this new implementation, a gear speed in the transmission in which the peripheral conditions described above are met is preferably always selected. The method according to the invention is therefore concerned with the low speed functions of a motor vehicle and will be described in more detail below. However, as a result the disadvantages described at the beginning are avoided and corresponding advantages are achieved.

There are a multiplicity of possible ways of advantageously configuring and developing this alternative implementation of the invention. By way of example:

In accordance with an added feature of the invention, the clutch may be actuated in such a way that when the gear speed is engaged the transmission input shaft speed is guided to below the engine idling speed. In a preferred embodiment, the respectively next lowest gear speeds are correspondingly engaged in a sequential fashion. The foregoing steps are advantageously carried out until the transmission is shifted into its first gear speed.

Again, the clutch is preferably slip-controlled. In accordance with again a further feature of the invention, the method steps are carried out in a double clutch transmission. In a concomitant feature of the invention, the respective gear speed changes are implemented using two separate clutches, which are in each case assigned a transmission input shaft.

Other features which are considered as characteristic for the invention are set forth in the appended claims.

Although the invention is illustrated and described herein as embodied in a method of preventing load change impacts in a motor vehicle, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENT

Figure 1:
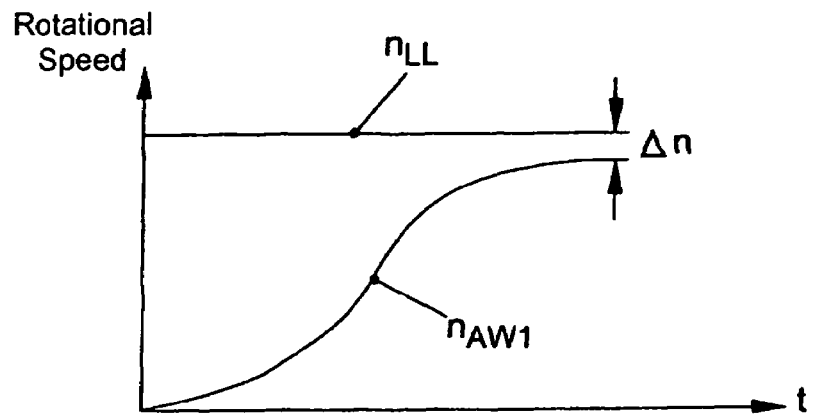
FIG. 1 is a schematic illustration of the transmission input shaft speeds or the engine idling speed plotted over time without the activation of the accelerator pedal when the motor vehicle is traveling on the flat.
Figure 2:
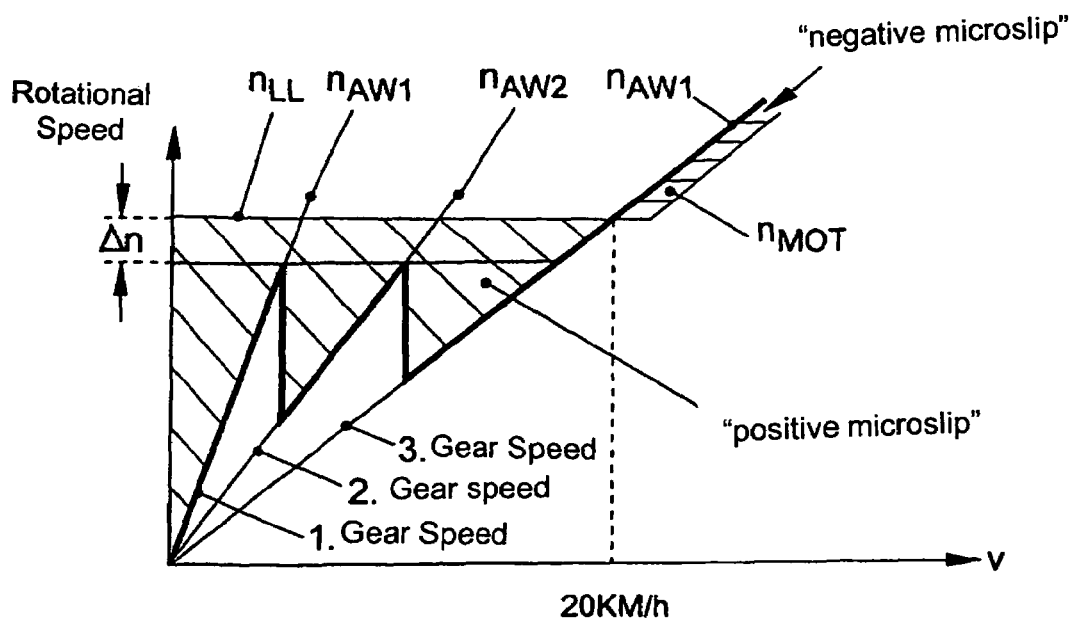
FIG. 2 is a schematic illustration of the transmission input shaft speeds or of the engine speed plotted over the velocity during various changes of gear speed without the activation of the accelerator pedal when the motor vehicle is traveling downhill.
Figure 3:
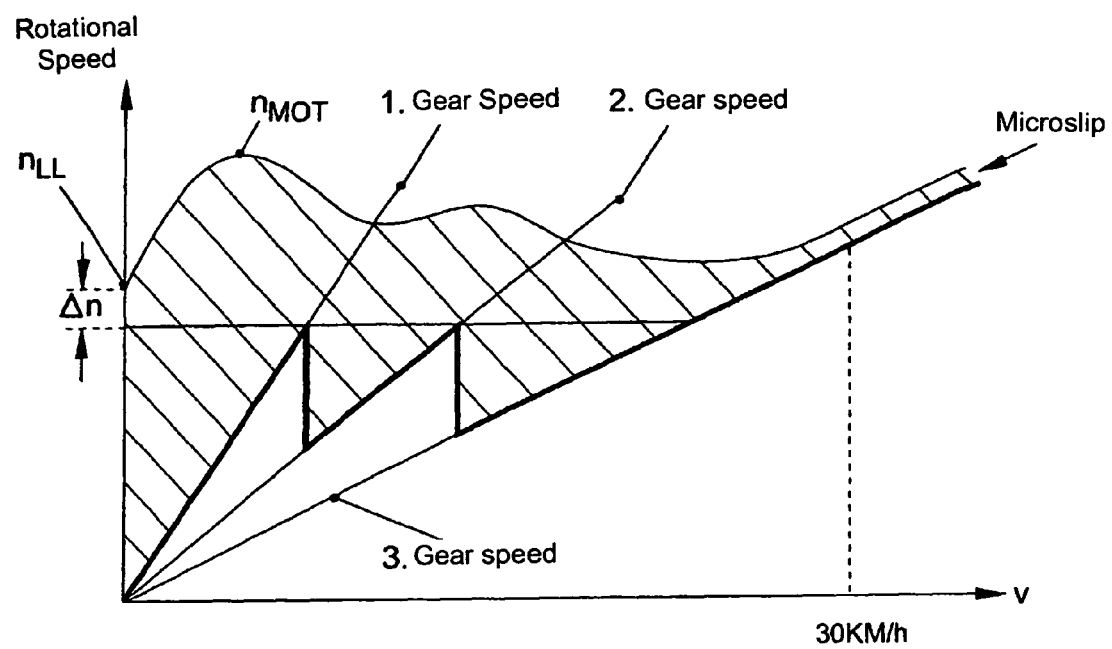
FIG. 3 is a schematic illustration of the transmission input shaft speeds or of the engine speed as a function of the velocity during changes of gear speed with slight activation of the accelerator pedal, specifically with "minimum opening of the throttle."

Referring now to the figures of the drawing in detail, FIGS. 1 to 3 illustrate the method according to the invention for preventing load change impacts in a motor vehicle. The motor vehicle which is not illustrated here has a transmission, preferably an automatic or automated change speed gear box, in particular a transmission which is embodied as a double clutch transmission. As already known in the prior art, the corresponding control unit which is implemented on an electronic and/or electrical basis and which also has further corresponding components, in particular a microprocessor, is present.

Thus, the rotational speeds of the driven wheels or the respective transmission input shaft speeds and the transmission output shaft speed are preferably measured and the engine speed is also correspondingly measured. Owing to the change in the position of the accelerator pedal, the driver of the motor vehicle can allow corresponding information as to whether an acceleration of the motor vehicle or else braking of the motor vehicle is desired, for example by activating the brake pedal, to be fed to the control unit. In particular owing to abrupt changes in the position of the accelerator pedal it is possible for load change impacts, which are to be avoided according to the inventive method, to occur in the drive train of the vehicle.

At least one clutch is provided between the drive engine and the transmission of the motor vehicle. If the transmission is embodied as a double clutch transmission, in each case two separate transmission input shafts and two separate clutches are provided. The transmission has a plurality of gear speeds (synonym: gear steps) which can be engaged, in which case, if the transmission is embodied as a double clutch transmission the first, third and fifth gear speeds are preferably assigned to the first transmission input shaft, and the second, fourth and sixth gear speeds are preferably assigned to the second transmission input shaft. The clutch or the two clutches can be actuated with respect to the torque to be transmitted. For this, corresponding actuators, which can preferably be activated hydraulically, are actuated using the control unit in such way that the closing and opening movements of the clutch or the clutches are correspondingly controlled or as a result the pressing forces are correspondingly implemented.

The disadvantages mentioned at the beginning are now avoided by virtue of the fact that during the starting process of the motor vehicle the clutch is actuated, and/or during the starting process of the motor vehicle the gear speeds in the transmission are engaged, in such a way that the transmission input shaft speed is below the engine idling speed.

Furthermore, the disadvantages mentioned at the beginning are avoided by virtue of the fact that during the braking or coasting process of the motor vehicle clutch is actuated, and/or the gear speeds in the transmission are engaged, in such a way that the transmission input shaft speed is below the engine idling speed.

From this it is apparent that the method according to the invention preferably applies to or is implemented in the low speed range of a motor vehicle, that is to say in the range in which vehicle velocities preferably below 20 km/h are achieved.

FIG. 1 then shows a first exemplary embodiment of the method according to the invention, specifically the illustration of the rotational speeds plotted over time t, specifically the engine idling speed $n_{LL}$ and the transmission input shaft speed $n_{AW1}$. Since the method according to the invention is described with reference to a double clutch transmission for the following figures, that is to say for all FIGS. 1 to 3, here in each case two transmission input shafts or two separate clutches which are assigned to the respective transmission input shafts are provided.

FIG. 1 then shows the starting process of the motor vehicle, specifically the particular starting process of starting at a crawl with the first gear speed engaged in the transmission without activation of the accelerator pedal. The starting of the motor vehicle at a crawl on the flat is illustrated here. The engine idling speed $n_{LL}$ can be clearly recognized as a constant rotational speed plotted over time t. It is clearly apparent that when the first gear speed is engaged here the transmission input shaft speed $n_{AW1}$ is made to approach the engine idling speed $n_{LL}$ until a predetermined difference $\Delta n$ in rotational speed is present. The difference $\Delta n = 100$ rpm (revs/minute) is preferably present so that the motor vehicle constantly moves at a crawl while taking into account the function $(n_{LL} - \Delta n)/i_{1ges}$, where "$i_{1ges}$" represents the total transmission ratio of the first component transmission of the double clutch transmission. In a specific case, for example in a "warming up program", the difference $\Delta n$ in rotational speed can possibly be slightly larger so that the velocity of the motor vehicle remains constant. FIG. 1 thus shows the motor vehicle starting at a crawl with the first gear speed engaged and without acceleration on the flat.

It is also conceivable that the motor vehicle starts or has to start with the first gear speed engaged and without activation of the accelerator pedal, that is to say without accelerating uphill. The corresponding clutch is then activated in such a way that the "crawling moment" is increased to a maximum limit, preferably to 40 Nm, until the difference $\Delta n$ in rotational speed is reached.

FIG. 1 therefore firstly shows the main basic idea of the method, specifically the adjustment of the transmission input shaft speed $n_{AW1}$ close to the engine idling speed $n_{LL}$ for the starting process of the motor vehicle by controlling the clutch, in particular controlling the torque to be transmitted by the clutch. Accordingly, open-loop and/or closed-loop control of the slip is preferably carried out on the clutch and when the first gear speed is engaged in the transmission the clutch is closed until the predetermined difference $\Delta n$ in rotational speed is present.

FIG. 2 then shows the starting process of the motor vehicle, in particular the motor vehicle starting at a crawl with the first gear speed engaged without changing the position of the accelerator pedal, but when traveling downhill. The respective rotational speeds are in turn represented on the Y axis, and the velocity v of the motor vehicle on the X axis. The constant engine idling speed $n_{LL}$ or the predetermined difference $\Delta n$ in rotational speed which is plotted here is clearly visible over a range of the velocity v. Furthermore, the characteristic curves for the different gear speeds, that is to say the corresponding rotational speeds $n_{AW1}$ of the first transmission output shaft for the first and third gear speeds and the rotational speed $n_{AW2}$ of the second transmission output shaft for the second gear speed are clearly shown. It is clearly shown that when the predetermined difference $\Delta n$ in rotational speed is reached at the respectively engaged gear speed, that is to say when a specific transmission input shaft speed is reached, the transmission is shifted into the next highest gear speed, clearly shown here when there is a change from the first gear speed to the second gear speed. In the next highest gear speed, that is to say when the second gear speed is engaged, the corresponding—second—clutch is then actuated in such a way that the—second—transmission input shaft speed $n_{AW2}$ is increased until the transmission input shaft speed $n_{AW2}$ is again made to approach the transmission input shaft speed in such a way that the predetermined difference $\Delta n$ in rotational speed is present. The transmission is not shifted from the second gear speed into the third gear speed until then, so that the first transmission input shaft speed $n_{AW1}$ drops again correspondingly and from here the starting process of the motor vehicle is then correspondingly subjected to further open-loop control, specifically the transmission input shaft speed $n_{AW2}$ rises quickly, intersects the engine idling speed $n_{LL}$ and then rises further with the engine speed $n_{mot}$ so that "a negative microslip" is then implemented only starting from a vehicle velocity of 20 km/h, while before a "positive slip" was implemented.

In the method according to FIG. 2, the predetermined difference $\Delta n$ in rotational speed is also preferably 100 revs/minute. The respective clutch is therefore always subjected to open-loop control, i.e. partially opened or partially closed, so that the pressing forces which are implemented by the clutch or the transmitted torques are such that the predetermined difference $\Delta n$ in rotational speed is reached or a specific transmission input shaft speed during the driving state of starting at a crawl is in fact not exceeded. In FIG. 2, the changes of the gear speeds from the first into the second gear speed or from the second into the third gear speed are preferably carried out only if the downhill force exceeds the driving resistances of the motor vehicle. The corresponding clutch or the separate two clutches in the case of a double clutch transmission are subjected to open-loop slip control in such a way that the method described above can be implemented.

FIG. 3 then shows a starting process of the motor vehicle, specifically the starting process of starting at a crawl and shifting with minimum opening of the throttle. It is in turn clearly apparent that the rotational speeds are plotted on the Y axis and the velocity v of the motor vehicle on the X axis. The essential difference with respect to FIG. 2 is then that the engine speed $n_{mot}$ does not extend here as far as the velocity 20 km/h as in the case of idling but rather the driver actually correspondingly slightly activates the accelerator pedal so that the engine speed $n_{mot}$ is slightly above the engine idling speed $n_{LL}$. The first, second and third gear speeds of the transmission or the corresponding characteristic curves for these gear speeds are also illustrated. The term "opening with minimum throttle" is to be understood that the accelerator pedal is only slightly activated here and the driver just slightly opens the throttle, specifically in order to implement the starting process of the motor vehicle. In the case of "minimum starting procedures" the engine speed $n_{mot}$ must not intersect the current speed of the respective transmission drive shaft. This means that only a "positive slip" is implemented in the drive train. The corresponding implementation of the method, specifically that the respective clutch is then controlled in such a way that when the first gear speed is engaged the transmission input shaft speed $n_{AW1}$ is made to approach the engine idling speed $n_{LL}$ until the predetermined difference $\Delta n$ in rotational speed, is achieved or is present is clearly apparent. Only then is the transmission shifted into the next highest gear speed, specifically into the second gear speed, in which case the transmission input shaft speed $n_{AW2}$ then also rises and the third gear speed is engaged when the rotational speed $n_{AW2}$ of the second gear speed at the transmission input shaft in turn reaches the limiting value. The starting process is then essentially ended by means of a velocity of more than 20 km/h, which is indicated correspondingly on the far right in FIG. 3, in which case a "positive microslip" is then implemented here, that is to say the engine speed $n_{mot}$ is just above the corresponding rotational speed $n_{AW1}$ of the third gear speed at the transmission input shaft. Furthermore, compared to FIG. 2 there is a difference here since in FIG. 2 a "negative microslip" is implemented since when the vehicle starts at a crawl downhill without the throttle open the vehicle in fact drives the engine and the engine does not drive the vehicle.

When the motor vehicle starts with somewhat more than "minimum throttle" the system should have already changed over to the driving state of "driving with minimum slip" starting from the second gear speed—as shown on the far right in FIG. 3.

It is also conceivable that in the "high load startups" which are not illustrated here, the system can already change over to the driving state "driving with microslip" when the first gear speed is engaged.

If the driver should—suddenly—go into the "normal throttle" state, rapid switching back from the second gear speed in the first gear speed is implemented. If the driver—in contrast—suddenly closes the throttle, the accelerator pedal position therefore changes in the direction of the "zero position", a "positive slip" is maintained at travel speeds below the respective synchronous rotational speed of the second gear speed by switching up into the second gear speed. To do this, the corresponding—other—separate clutch would have to be at the grinding point.

FIGS. 1 and 3 show the method according to the invention and the ratio of the individual rotational speeds to the time t or the individual rotational speeds to the velocity v of the motor vehicle, the corresponding clutch always being actuated in such a way that a corresponding slip is present so that the predetermined difference $\Delta n$ in rotational speed from the engine idling speed $n_{LL}$ is implemented. When the gear speeds change, for example from the first gear speed into the second gear speed according to FIG. 2 or FIG. 3, when the double clutch transmission opens the first clutch which is assigned to the first transmission input shaft opens while the second clutch which is assigned to the second transmission input shaft correspondingly closes. The second clutch is then also subjected to open-loop control in such a way that the second transmission input shaft speed accelerates to just a specific transmission input shaft speed so that in fact the predetermined difference $\Delta n$ in rotational speed from the engine idling speed $n_{LL}$ is brought about. The method is then correspondingly continued with a shift into the second gear speed so that—in a double clutch transmission—the second clutch which is assigned to the second transmission input shaft is opened again and the first clutch which is assigned to the first input shaft is closed, with the first clutch then being subjected to closed-loop slip control in such a way that although the first transmission input shaft speed accelerates in turn to a specific transmission input shaft speed it is such that the predetermined difference $\Delta n$ in rotational speed is implemented. It is also conceivable for gear speeds to be jumped over.

Although the method according to the invention is preferably described for a double clutch transmission with reference to FIGS. 1 to 3, it is also perfectly suitable for other forms of transmission, in which case for example a separating clutch is preferably provided as a friction clutch within the transmission. For this reason the actuation of the respective clutch is decisive, specifically always in such a way that the respective transmission input shaft speed is below the engine idling speed $n_{LL}$.

The method can also be applied for the opposite process, that is to say not for the starting process of a motor vehicle but also for the braking or coasting process of a motor vehicle. For this purpose, the corresponding clutch is subject to open-loop control during the braking or coasting process of the motor vehicle, and the gear speeds in the transmission are engaged, in such a way that the transmission input shaft speed is below the engine idling speed $n_{mot}$. As a result, "reversal" of FIG. 3 occurs. Thus, in the synchronization point of the third gear speed the first clutch of the double clutch transmission which is assigned to the third gear speed is then opened to such an extent that the driving resistances exceed the drive forces (sum of the creeping moment and downhill moment) and the motor vehicle can become slower. If the creeping moment is reduced to "zero" and the motor vehicle becomes faster, the first clutch is started up again so that an engine over-run for the purpose of braking is implemented. If the motor vehicle becomes slower than the synchronization rotational speed of the second gear speed, the second gear speed is correspondingly engaged here. The corresponding clutch is therefore always actuated in such a way that shifting occurs from the already engaged—old—gear speed into the—new—next lowest gear speed, in which case after the corresponding synchronization the specific transmission input shaft speed is reached with a correspondingly engaged—new—gear speed so that the predetermined difference $\Delta n$ in rotational speed from the engine idling speed $n_{LL}$ is present. It is also conceivable here that gear speeds are jumped over when shifting down.

As a result, with the method according to the invention load change impacts are prevented without a relatively large degree of expenditure on control, that is to say the disadvantages mentioned at the beginning are avoided and corresponding advantages are easily and cost-effectively achieved, in particular for the driving state of driving off or for the braking process or the over-running, or coasting process, of a motor vehicle.

We claim:

1. A method for preventing load change impacts in a motor vehicle, the motor vehicle having at least one clutch between a drive engine and a transmission, and the transmission having a plurality of selectively engageable gear speeds, and the clutch being actuated with respect to a torque to be transmitted, the method which comprises:

during a starting process of the motor vehicle, actuating the clutch and/or engaging the gear speeds in the transmission, such that a transmission input shaft speed lies below an engine idling speed; and when a predetermined difference in rotational speed is reached, where a specific transmission input shaft speed is reached, switching the transmission to a next higher gear speed.

2. The method according to claim 1, which comprises preventing load change impacts owing to abrupt changes in a position of an accelerator pedal.

3. The method according to claim 1, wherein the transmission is a double clutch transmission.

4. The method according to claim 1, which comprises actuating the clutch such that, when a first gear speed is engaged, the transmission input shaft speed is caused to approach the engine idling speed until the predetermined difference in rotational speed is present.

5. The method according to claim 4, which comprises, in a next higher gear speed, causing the transmission input shaft speed in turn to approach the specific transmission input shaft speed.

6. The method according to claim 5, which comprises carrying out the method steps until the transmission shifts into a third gear speed or a highest gear speed thereof.

7. The method according to claim 1, wherein the clutch is a slip-controlled clutch.

8. A method for preventing load change impacts in a motor vehicle, the motor vehicle having at least one clutch between a drive engine and a transmission, and the transmission having a plurality of selectively engageable gear speeds, and the clutch being actuated with respect to a torque to be transmitted, the method which comprises:

during a braking or coasting process of the motor vehicle, actuating the clutch and/or engaging the gear speeds in the transmission, such that a transmission input shaft speed lies below an engine idling speed; and shifting the transmission from a currently engaged, old gear speed into a new, next-lower gear speed if, after a corresponding synchronization, a specific transmission input shaft speed is reached with a correspondingly engaged new gear speed, so that a predetermined difference in rotational speed with respect to the engine idling speed is present.

9. The method according to claim 1, which comprises preventing load change impacts owing to abrupt changes in a position of a pedal.

10. The method according to claim 1, wherein the transmission is a double clutch transmission.

11. The method according to claim 8, which comprises actuating the clutch in such a way that when the gear speed is engaged the transmission input shaft speed is guided to below the engine idling speed.

12. The method according to claim 8, which comprises engaging respectively next lower gear speeds correspondingly in a sequential fashion.

13. The method according to claim 12, which comprises carrying out the method steps until the transmission is shifted into a first gear speed thereof.

14. The method according to claim 8, wherein the clutch is slip-controlled.

15. The method according to claim 10, which comprises implementing respective gear speed changes using two separate clutches, each assigned a respective transmission input shaft.

* * * * *